United States Patent
Carroll et al.

(10) Patent No.: US 6,933,623 B2
(45) Date of Patent: *Aug. 23, 2005

(54) WAVE ENERGY CONVERTERS UTILIZING PRESSURE DIFFERENCES

(75) Inventors: Charles B. Carroll, Mercer County, NJ (US); Meredith Bell, Milford, CT (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,274

(22) Filed: Jun. 7, 2004

(65) Prior Publication Data

US 2004/0217597 A1 Nov. 4, 2004

Related U.S. Application Data

(62) Division of application No. 09/763,247, filed as application No. PCT/US00/14652 on May 26, 2000, now Pat. No. 6,768,216.
(60) Provisional application No. 60/136,189, filed on May 27, 1999.

(51) Int. Cl.[7] ......................... F03B 13/10; F03B 13/12; F03B 13/00; H02P 9/04
(52) U.S. Cl. ......................... 290/42; 290/43; 290/53; 290/54
(58) Field of Search ................... 290/42, 43, 53, 290/54; 416/86, 91, 171, 175, 189, 7; 415/148; 405/75, 76, 79; 417/331, 333, 61, 100, 322, 330; 60/505, 497, 499, 507, 398, 502, 506

(56) References Cited

U.S. PATENT DOCUMENTS

| | | | | |
|---|---|---|---|---|
| 1,455,718 A | * | 5/1923 | Delong | 417/100 |
| 4,326,840 A | * | 4/1982 | Hicks et al. | 417/331 |
| 4,466,244 A | * | 8/1984 | Wu | 60/398 |
| 4,490,232 A | * | 12/1984 | Lapeyre | 204/278 |
| 4,776,772 A | * | 10/1988 | Everett | 417/333 |
| 4,883,411 A | * | 11/1989 | Windle | 417/331 |
| 4,914,915 A | * | 4/1990 | Linderfelt | 60/502 |
| 5,244,359 A | * | 9/1993 | Slonim | 417/332 |
| 5,701,740 A | * | 12/1997 | Tveter | 60/505 |
| 5,909,060 A | * | 6/1999 | Gardner | 290/53 |
| 6,226,989 B1 | * | 5/2001 | Fredriksson et al. | 60/501 |
| 6,291,904 B1 | * | 9/2001 | Carroll | 290/53 |
| 6,392,314 B1 | * | 5/2002 | Dick | 290/53 |
| 6,402,459 B1 | * | 6/2002 | Pauli et al. | 415/3.1 |
| 6,772,592 B2 | * | 8/2004 | Gerber et al. | 60/495 |

* cited by examiner

Primary Examiner—Darren Schuberg
Assistant Examiner—Julio Gonzalez
(74) Attorney, Agent, or Firm—Henry I. Schanzer

(57) ABSTRACT

An elongated cylinder is fully submerged, in vertical orientation, just below the mean water level of, e.g., and ocean, and of a length, dependent upon surface waves of preselected wavelength, such that the top of the cylinder experiences relatively large pressure variations in response to over passing waves while the bottom of the cylinder experiences an almost steady pressure substantially independent of the over passing waves. The pressure differential over the length of the cylinder is used for causing relative movements between the cylinder and adjoining water, and such relative movements are used for driving a piston of an energy converter. The cylinder can be hollow and in fixed location for causing water movements through the cylinder, or the cylinder can move through the water relative to a fixed transducer. In one version of the movable cylinder, the transducer is fixedly mounted on a fixed in place float disposed within the movable cylinder. In a second version, the transducer is fixedly mounted beneath the movable cylinder on the ocean floor, and the cylinder is coupled to the transducer.

8 Claims, 11 Drawing Sheets

WAVE ENERGY CONVERTERS UTILIZING PRESSURE DIFFERENCES

This is a division of U.S. patent application Ser. No. 09/763,247, filed Oct. 15, 2001, now U.S. Pat. No. 6,768,216 which application claims the benefit of the filing date of international application PCT/US00/14652, filed 26 May 2000 which claims the benefit of Povisional application No. 60/136,189, filed May 27, 1999.

BACKGROUND OF THE INVENTION

This invention relates to the conversion of energy from naturally occurring sources of mechanical energy, and particularly to the conversion of the mechanical energy present in ocean surface waves to useful energy, particularly electrical energy.

In many known systems for capturing surface wave energy, a float is used for being vertically oscillated in response to passing waves. The float is rigidly coupled to an energy converter which is driven in response to vertical movements of the float. In one system, described in U.S. Pat. Nos. 4,773,221 and 4,277,690 (the subject matter of which is incorporated herein by reference), an open-ended hollow tube is rigidly suspended beneath a float, the tube being completely submerged and in vertical orientation.

The tube vertically oscillates in the water in correspondence with movements of the float and, in the absence of anything within the tube, the tube moves freely relative to the column of water within the open-ended tube. In one embodiment, a movable piston is disposed within the tube for blocking relative movements between the water column and the tube. As the tube and float oscillate within the water, the mass of water within the tube tends to block corresponding movements of the piston, hence the piston moves relative to the tube. Actual movements of the piston do occur, however, and provided the entire system is oscillating at its natural resonant frequency, relatively large amplitude oscillations of the piston can occur. The moving piston drives an energy converter fixedly mounted, e.g., within the float, for converting the piston movements to useful energy.

While these float driven tube systems work, efficient operation requires that the natural resonant frequency of the system closely matches the frequency of the ocean waves driving the system. While this can be generally accomplished at a specific site and specific time, particularly if means for adjusting the resonant frequency of the system in response to changing surface wave frequencies are provided, a problem is that, at any instant, multiple random surface waves are present whereby much of the wave energy present can not be efficiently transferred to the oscillating system. Also, the means for adjusting the resonant frequency of the device generally involves changing the water mass within the device. Since this mass is quite large, it is not readily changed.

A feature of the present invention is that a relatively high efficiency of operation is obtained which is relatively insensitive to random variations of wave frequencies and amplitudes.

SUMMARY OF THE INVENTION

In a first embodiment of the invention, an open-ended, hollow tube is disposed in vertical, submerged and fixed location relative to the mean water level. Specifically, the tube is not in "floating" (moveable) relationship with the passing waves. The length of the tube and the depth of the top end of the tube beneath the mean water level are selected, as described hereinafter, depending upon the frequency and amplitude of the most prevalent anticipated surface waves, as well as the water depth. While maximum efficiency of operation is attained when the anticipated waves are present, the fall-off of efficiency of operation is relatively small with variations of wave conditions.

During operation, pressure variations, at the top, open end of the tube (caused by passing waves) in comparison with a relatively fixed pressure at the open, bottom end of the tube (unaffected by passing waves) cause vertical flows of water through the tube which are used for driving an energy converter, preferably by means of a movable piston within the tube.

In a second embodiment of the invention, a hollow tube having a closed top end and a bottom open end is disposed in vertical, submerged but relatively movable relation with the mean water level. In a preferred embodiment, the tube is secured for vertical cyclical movements relative to a float fixedly submerged beneath the water surface and disposed within the tube. The dimensions of the tube and its at-rest location relative to the water surface are in accordance with the tube of the first embodiment except, in the second embodiment, the piston movable within the tube of the first embodiment comprises the closed top end of the tube of the second embodiment. During operation, pressure variations between the top and bottom ends of the tube cause vertical oscillations of the tube relative to the fixed float, and such oscillations are used for driving an energy converter.

In all embodiments, movements of the tube relative to the adjoining water are caused not by wave-induced displacements of a float on the water surface, but in response to pressure variations caused by passing waves. Also, as noted hereinafter, tilting movements of the float caused by water movements can be used for capturing wave energy.

DESCRIPTION OF THE DRAWINGS

The drawings are schematic and not necessarily to scale.

DESCRIPTION OF PREFERRED EMBODIMENTS OF THE INVENTION

Figure 1:
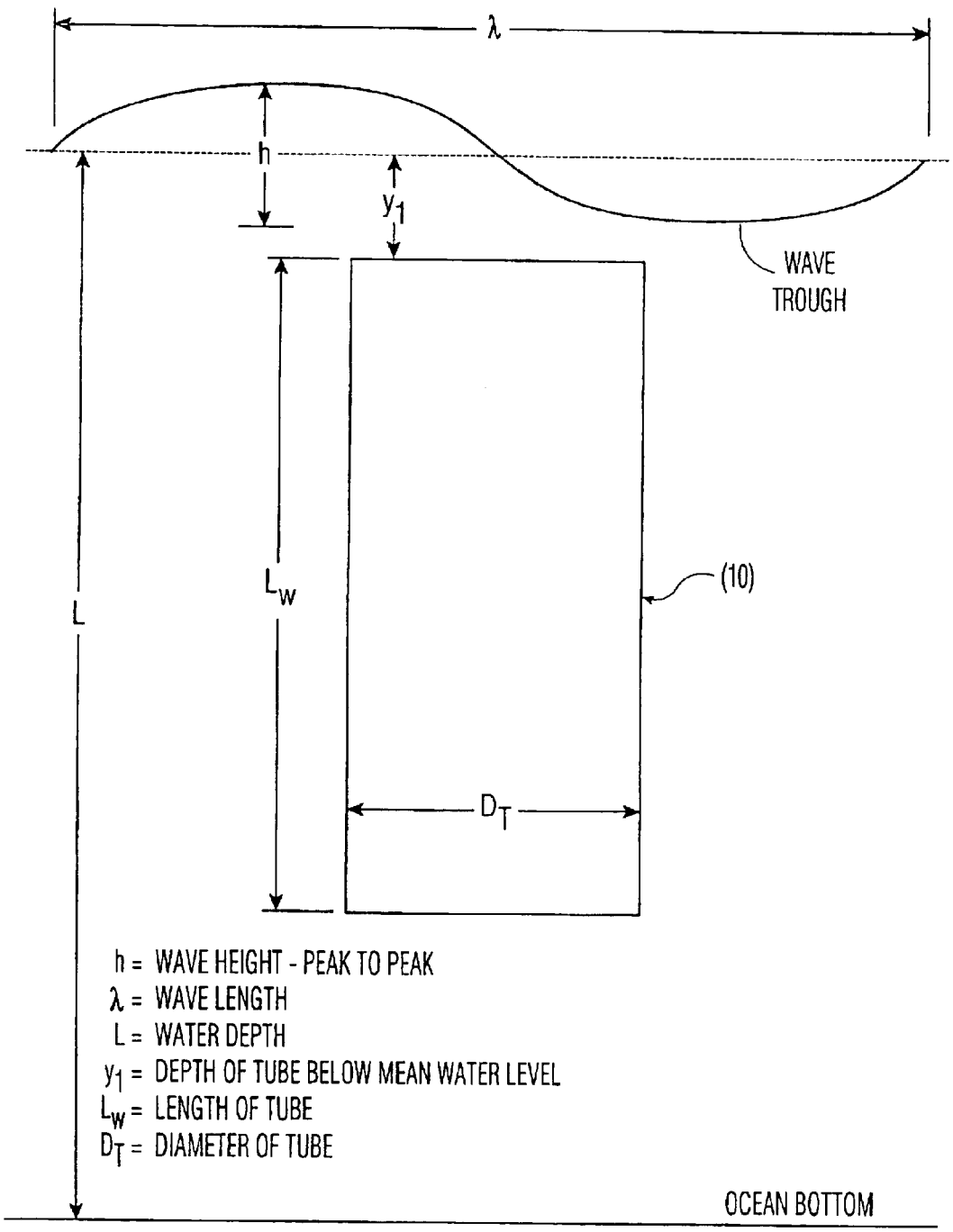
FIG. 1 is a sketch for identifying various relevant dimensional parameters of a system according to the present invention deployed in a body of water.

An apparatus according to a first embodiment of the present invention is shown in FIG. 1. Shown schematically is an open-ended tube 10 disposed (as herewith described) in fixed, vertical orientation below the mean water level of a body of water, e.g., an ocean having wind driven surface waves. FIG. 1 also identifies parameters important in the practice of the invention, i.e., wave height, wave length, water depth, depth of the top of the tube below the water surface, length of the tube, and the diameter of the tube. The optimum depth for the lower end of the tube is dependent on the wavelength (λ) of the longest waves to be utilized in an efficient manner. The principle of operation is that the changes in water energy level, which can be expressed as changes in pressure, due to the passage of wave peaks and troughs, is highest near the surface, and these pressure changes decay exponentially with depth below the surface. Thus, the top of a long tube experiences relatively large pressure variations while the bottom of the tube experiences an almost steady pressure that is equal to the pressure due to the weight of water above it at the mean water level.

The energy levels at different water depths under a wave field can be calculated with Equations 1 and 2. The equations are for deep water waves and are modified somewhat by the depth in more shallow water (depths less than λ/2). The water energy levels due to waves of a given size are a function of wave length and water depth. There is little practical value in extending the tube bottom any deeper than ½ the wavelength of the longest waves to be optimally used because the energy level is already greatly reduced from its near surface value.

$$E_d = E_s \exp(-2\pi d/\lambda) \quad (1)$$

where: $E_s$ is the energy due to a wave at the water surface, and $E_d$ is the energy due to a wave at a depth equal to d, and λ is the wave length of the waves being considered The wave length of deep water waves may be calculated by the formula:

$$\lambda = gT^2/2\pi \quad (2)$$

where: g is the gravitational constant, 9.8 meters per second per second, and

T is the period of the waves in seconds

As an example using equation 2, for waves with a period of 7 seconds, the wave length is $\lambda_7 = 76.43$ meters As a second example, for waves with a period of 5 seconds, the wave length is $\lambda_5 = 38.99$ meters For waves with a period of 7 seconds and a wave length of 76.43 meters, and waves with a period of 5 seconds and a wave length of 38.99 meters, the energy at different depths can be calculated as percentage of the energy at the surface, using Equation 1. This is shown in Table 1.

TABLE 1

| energy water depth (m) | depth as a % of $\lambda_7$ | $E_{d7}$ as % of $E_s$ | depth as a % of $\lambda_5$ | $E_{d5}$ as % of $E_s$ |
|---|---|---|---|---|
| 0.1 | 0.1 | 99.2 | 0.3 | 98.4 |
| 0.5 | 0.6 | 96.0 | 1.3 | 92.3 |
| 1.0 | 1.3 | 92.1 | 2.6 | 85.1 |
| 19.1 | 25 | 20.8 | 49 | 4.6 |
| 38.21 | 50 | 4.3 | 98 | 0.2 |
| 76.43 | 100 | 0.2 | 196 | 0 |

Table 1 shows that when waves with a period of 7 seconds are present, and the tube 10 has its top end at depth of 0.5 meters below the surface, and its bottom end at a depth of 38.21 meters below the surface, the top will experience pressure changes 91.7% (96–4.3) larger than the bottom. These conditions will cause water to flow down the inside of the tube when a wave peak is over the top end, and water to flow up the inside of the tube when a wave trough is at the top of the tube. This pressurized water flow provides the opportunity to extract mechanical power from the wave energy. Extending the tube from 38.21 meters to 76.43 meters in length only increases the pressure differential by 4.1% (4.3–0.2).

Further study of the Table 1 shows that when waves with a 5 second period are present, a tube with its bottom at 38.21 meters below the surface has an even lower pressure variation at the bottom, 0.2%, than when 7 second period waves are present. Thus wave energy from shorter wave length and shorter period waves can be collected efficiently. When waves of longer period are present, the energy, or pressure variations, at the tube bottom gradually increase. Thus, the efficiency of energy collection will gradually decrease. However, the range of efficient operation is much larger than in the previously described known devices that are tuned for specific wave periods for resonant and efficient operation. These devices can suffer a significant loss of efficiency when the wave period changes even a few seconds.

Table 1 also shows that as the wave period decreases, the importance of the top of the tube being near the surface increases. For example, with a water depth of the top of the tube being 0.5 meters under the surface in 7 second period waves, the energy has decreased at the tube top to 96% of its maximum, while in 5 second waves the energy has decreased to 92.3% of its maximum.

Regular waves are waves that have a consistent period. A sine wave is an example of a regular wave. Regular waves at a constant period would allow the tuning of a resonant wave energy capture device to the specific wave period, even though the wave period may change with the negative impact mentioned above. In practice, ocean and sea waves are both random and irregular and simultaneously contain waves with different periods. An example of this is a case when ocean swells with a 10 second period are present along with wind waves with a 5 second period. The inventive apparatus has the ability to capture energy efficiently from irregular waves as well as from regular waves. This is because the apparatus is not optimized for a specific period but is driven dependent upon the instantaneous quantity of water above or below the mean water level (but subject to "cancellation effects" discussed hereinafter).

The theoretical amount of energy that can be captured at a site with a given water depth and wave characteristics can be determined as follows. Bernoulli's Equation for fluids in unsteady irrotational flow is:

$$\frac{\delta \phi_1}{\delta t} + \frac{P_1}{\rho} + g y_1 + \frac{V_1^2}{2} = \frac{\delta \phi_2}{\delta t} + \frac{P_2}{\rho} + g y_2 + \frac{V_2^2}{2}$$

Where (1) is a point in the fluid and (2) is another point in the fluid, and where:

$\delta \phi / \delta t$ is the differential of the velocity potential in meters squared per second squared ($m^2/s^2$), at a point, and gy is the gravitational constant times the depth at a point in $m^2/s^2$, and P/ρ is the pressure at a point divided by the fluid density in $m^2/s^2$, (to achieve these dimensions it should be remembered that mass can be expressed as force divided by acceleration), and $V^2/2$ is the velocity squared of the fluid at that point $m^2/s^2$.

For example, if point 1 is considered to be near the water surface as is the top of the tube, and point 2 is deeper as is the bottom of the tube, the Bernoulli Equation can be the basis for analysing the different forms of energy available at each point as time passes.

Figure 2:
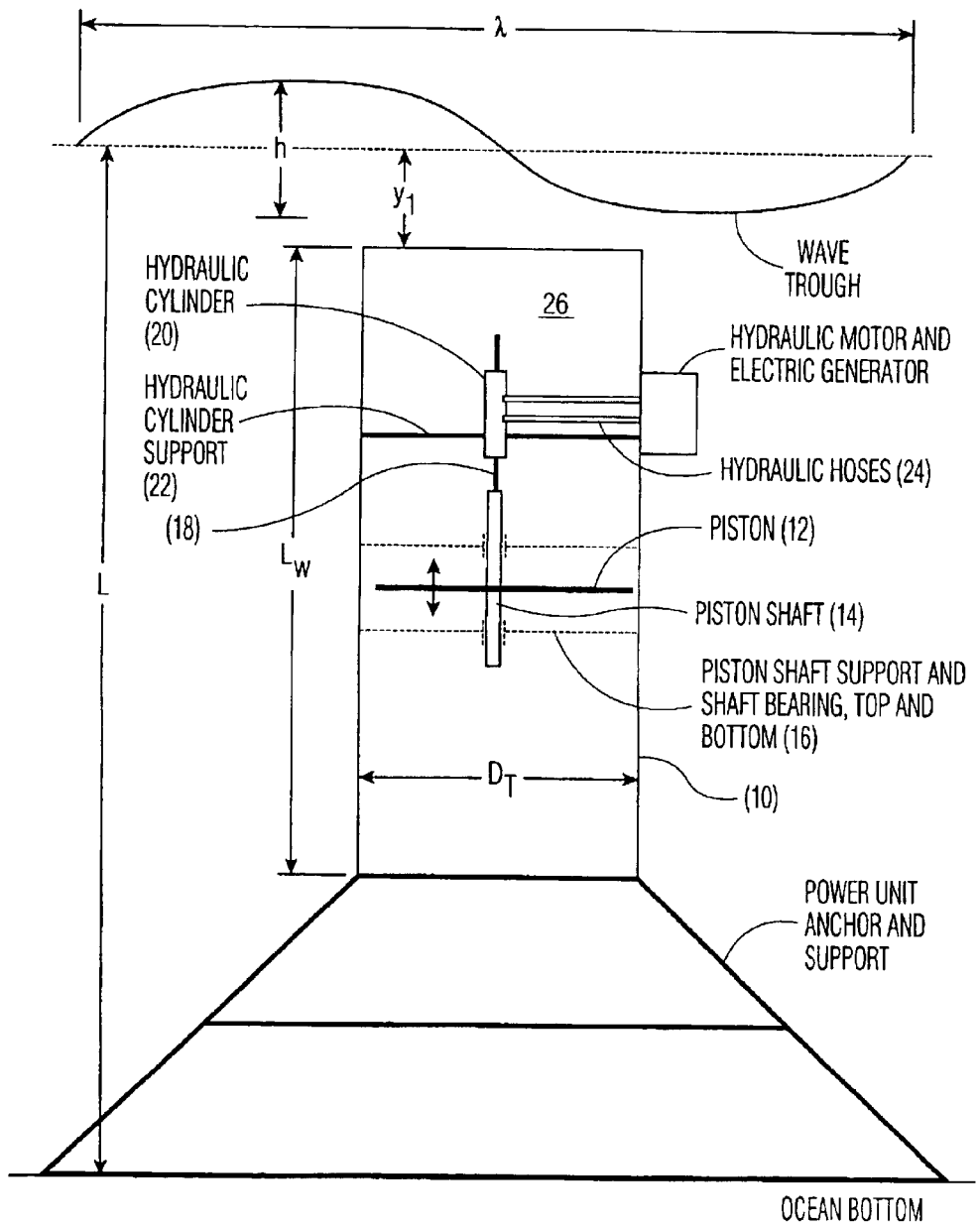
FIGS. 2, 2A and 3–6 are side sectional views showing different embodiments of power converting systems in accordance with a first embodiment of the present invention deployed in bodies of water, e.g., an ocean.
Figure 2A:
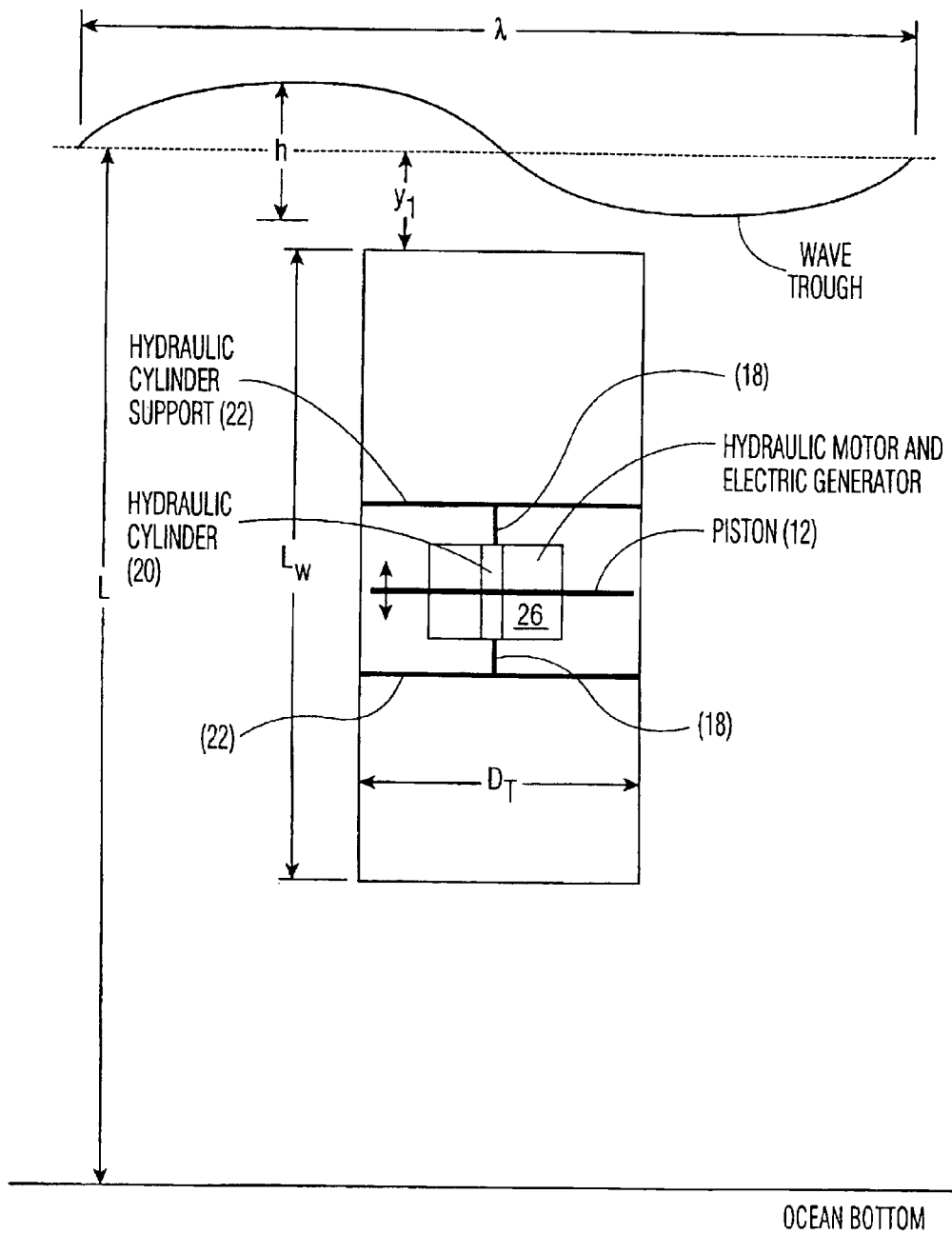

Principle of Operation—Energy Capture: The simple long tube described above provides a situation where there are two different pressure levels appearing simultaneously at each end of the tube. Two preferred methods of capturing energy from the available energy in the tube are as follows:

1. A piston 12, shown in FIG. 2, placed in the tube is forcefully driven up and down by water in the tube moving up and down due to the varying pressure differentials above and below the piston. This forceful movement is converted to mechanical power by attaching a device to the piston that resists its movement. One example is the rod of a hydraulic cylinder. The motion of the cylinder rod pumps a pressurized fluid (hydraulic fluid) through a hydraulic motor which then rotates. The mechanical power produced by the hydraulic motor is converted to electrical power by a generator attached to the motor. In FIG. 2, the water driven piston 12 and its shaft are shown to move up and down while guided by the Piston Shaft Support and Shaft Bearings 16. To reduce mechanical drag on the system the piston preferably does not touch the sides of the tube. A clearance between the piston rim and tube of 3 to 6 millimeters will permit some water to leak past the piston. This represents a loss of power but is a small percentage of the area for a piston that is larger than 1 meter in diameter. A hydraulic cylinder rod 18 (from a hydraulic cylinder 20) is attached to the top of the piston shaft 12. A hydraulic cylinder support 22 fixedly attaches the cylinder 20 to the tube 10. Hydraulic hoses 24 carry the hydraulic fluid back and forth to a watertight compartment that contains an hydraulic motor and electric generator. A double-ended cylinder (rod extends from both ends) is preferred because the cylinder performance is the same in both stroke directions. The piston is made buoyant enough to cause the piston—piston shaft—hydraulic cylinder rod assembly to be neutrally buoyant, and therefore move up or down equally with the same applied forces. A preferred arrangement of the components is shown in FIG. 2A. In this arrangement, the piston 12 slides up and down on the hydraulic cylinder itself. Both ends of the hydraulic cylinder rod 18 are fixedly attached to the tube 10 by the hydraulic cylinder rod supports 22. A watertight compartment 26 is part of the piston assembly and contains the hydraulic motor and electric generator. This compartment is buoyant enough to cause the entire piston assembly to be neutrally buoyant.

FIG. 2 also shows an arrangement for mooring the power converting system. This is later described.

Figure 3:
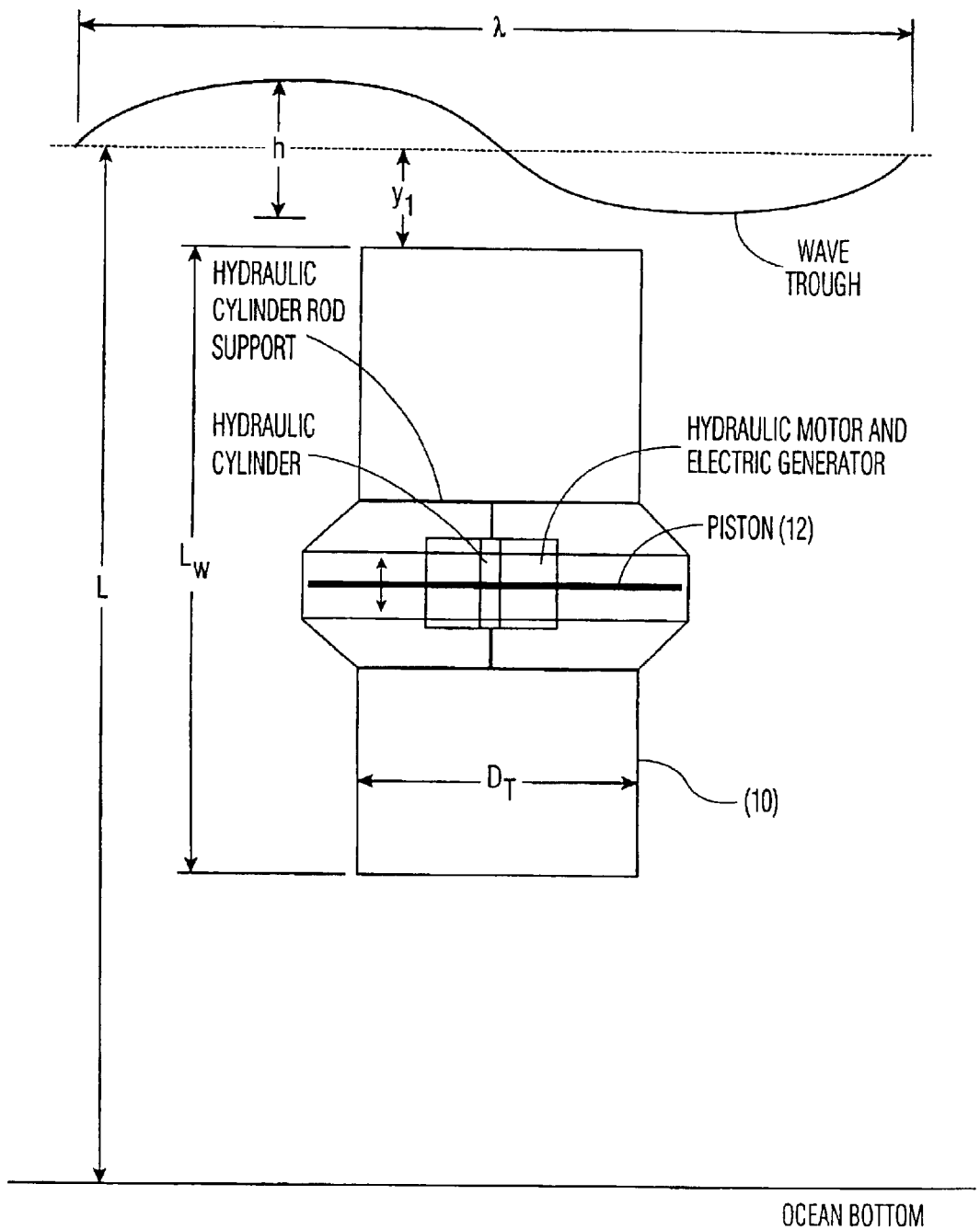

FIG. 3 shows an arrangement where the area of the piston 12 is larger than the area of the tube 10 at its top and bottom ends. This is to illustrate that the piston area can be either larger or smaller than the tube end areas. In a given situation, the arrangement in FIG. 3 will produce a higher force and a shorter stroke than if the piston and tube ends have the same area. This is because the tube length and depth determines the pressure differential on the piston, and the tube end areas determine the volume of water flow. Thus, the same pressure on a larger piston area produces more force, but more water volume is required to move the larger piston. FIG. 3 illustrates that the piston size can be varied to match desired piston forces and strokes. However there are losses of energy incurred whenever the moving water is caused to change direction as it does when the piston area is different than the tube end areas. Thus, the most energy efficient configuration is when the piston and tube ends have the same area.

A second power take-off approach (not illustrated) is to attach a rod to the piston that moves vertically with the piston. Instead of this piston rod being attached to a hydraulic cylinder, it is attached to a positive drive belt (the belt and sprockets having teeth that are positively engaged), that is around two vertically arranged sprockets. As the piston is driven up and down by the wave energy it drives one side of the belt up and down causing the sprockets to rotate. One of the shafts of a driven sprocket is coupled to a generator to produce electric power.

A third power take-off approach (not illustrated) is to directly drive a linear generating device, such as a linear electric motor, with the piston movement. Due to the sub-surface marine environment, the hydraulic approach is preferred.

Figure 4:
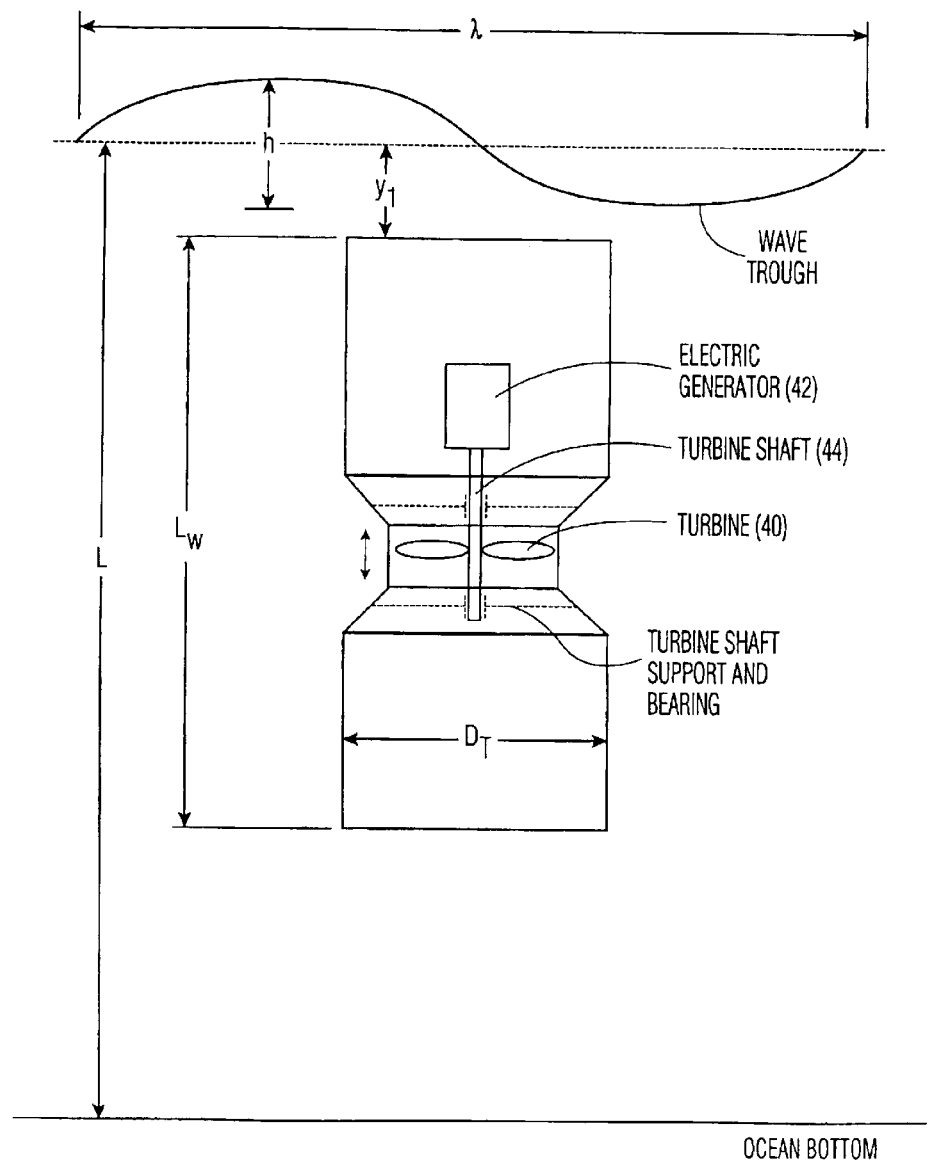

2. In the system shown in FIG. 4, a turbine 40 is disposed within a tube 10 for being driven to rotate by the water flow in the tube moving up and down due to the varying pressure differential at the top and bottom of the tube. This rotation produces mechanical power by, for example coupling the shaft of an electric generator 42 to the turbine shaft 44. The tube preferably has, as shown, large diameter ends, and a small diameter turbine section in order to increase the water flow velocity through the turbine.

The moving piston approach (1) is preferred because in general, the inventive systems are more readily designed for providing powerful strokes of limited length rather than providing rapid water flow. Each approach is described in more detail below:

1. Moving piston approach: As a piston such as shown as 12 in FIGS. 2, 2A, and 3 moves against resistance it produces a force (Newtons). The piston moves a certain distance in a given time (meters per second). The product of this force times velocity is Newton-meters per second (Nm/s) which converts directly to watts of power. One Nm/s is equal to one watt.

$$\text{Power}_{watts} = \text{Force}_{Newtons} \times \text{Velocity}_{meters/second} \tag{3}$$

A longer stroke in a given time at a lower force can produce the same amount of power as a shorter stroke in the same time at a higher force, or vice versa. In practical applications of the piston approach, there is a limit on the length of piston stroke allowed. This is because practical devices such as a hydraulic cylinder have a certain amount of stroke, and exceeding that physical limit damages the cylinder. Also, in a given location, the waves are normally in a known range of sizes during the year. Thus, it would be economically impractical to provide equipment that could stroke farther than would be caused by the normally present waves. Prevention of damage by larger than normal waves, such as storm waves (not illustrated), is by pressure relief doors in the tube 10 above and below the pistons 12 range of motion. If a wave produces a pressure differential (and resulting piston force) across the piston that is more than a preselected valve, the doors are pushed open. This allows water to bypass the piston, reducing its force and preventing damage to the device.

A piston system will normally have provision for a certain physical stroke range such as 1 meter, but could be longer or shorter. However, the force can be increased or decreased by simply making the unit and its piston larger or smaller. This is an important factor in the design of a practical system, and is based on the fact that fluid pressure does not depend on the size of the area it is acting upon. For example, assume that waves are expected to be present that provide an average pressure differential of 2,000 Pascals (Pa) between the top and the bottom of the tube, as described above. A Pascal is a pressure of one Newton per square meter. Also, assume that the waves have a period of 5 seconds, that is, a wave will move from a peak to a trough in 2.5 seconds. If the piston stroke is limited to 1 meter, and it is moving its full stroke, it will have an average velocity of 1/2.5=0.4 m/s. If 1000 watts, or 1000 Nm/s, is desired from the system, then the average force must be (1000 Nm/s)/(0.4 m/s)=2,500 N. Since the pressure differential is 2,000 Pa or 2,000 N/m², the piston area must be (2,500 N)/(2,000 N/m²)=1.25 m². This corresponds to a piston diameter of 1.26 meters (D).

The mass of water in the tube and piston area moves along with the piston. It must be accelerated in one direction, decelerated to a stop, accelerated in the other direction, decelerated to a stop, and so on. Therefore, some of the force produced by the pressure differential on the piston must be used to accelerate the water mass. This can be calculated as force equals mass times acceleration, or $F_{water}=m_{water}a$. Some of this force is recoverable from the decelerating water. However, having to accelerate and decelerate a large water mass causes the optimum tube 10 length to be shorter than ½ the waves length. This is because a longer tube captures a higher pressure differential than a shorter tube, but also contains more water. The optimum tube 10 length can be calculated for a specific wave length, wave height, and water depth using Bernoulli's Equation as previously discussed.

By way of concise summary, characteristics of the moving piston approach are:
1. A tube long enough to create a significant varying pressure differential between its top and bottom ends when placed in waves with a range of wavelengths.
2. A piston within the tube that causes the varying pressure from the top of the tube to occur at the top surface of the piston, and the relatively constant pressure from the bottom of the tube to occur on the bottom surface of the piston.
3. Because of 1. and 2. the piston is driven up and down with force and velocity.
4. A means, such as a hydraulic cylinder and motor, to convert the reciprocating mechanical power of 3. into rotary mechanical power.
5. An electric generator to convert the rotary mechanical power of 4. into electrical power.
6. The piston diameter can be larger or smaller than the tube diameter, producing either a relatively high force low velocity motion or a relatively low force high velocity motion.
7. The sizes of the system tube and piston components affect the amount of water mass enclosed within the system which affects the amount of acceleration of the piston and water that can be achieved from a given wave environment.

Additional requirements, discussed further hereinafter, are:
8. The system can utilize a fixed mooring to the sea bottom, or a mooring that provides a floating unit to balance the piston forces with a properly sized buoyant section.
9. The system can utilize a mooring that combines a fixed buoyant mooring and additional buoyancy to compensate for tidal variations by moving the tube top up and down with the tide.

Various mooring arrangements are described hereinafter.
2. Description of turbine approach: The principles of operation of units that use a water turbine instead of a moving piston for power extraction are very similar. The key difference is the need for a high water flow velocity. As shown in Equation 3, force and velocity make equal contributions to power output.

$$\text{Power}_{watts}=\text{Force}_{Newtons} \times \text{Velocity}_{meters/second} \quad (3)$$

The moving piston approach must limit the stroke and hence the velocity for practical reasons. Thus, the force is emphasized by providing a large piston area. When using a turbine to extract power from flowing fluids a high velocity is desirable to overcome initial static friction to insure that the turbine starts rotating, and to provide efficient operation. The power available for capture from a cross sectional area of fluid flow is given by:

$$\text{Power}_{watts}=0.5 \times A \times \rho \times V^3 \quad (4)$$

Where A is the cross sectional area of flow in m², ρ is the density of the fluid (1000 kg/m³ for water), and V is the velocity in meters per second.

A high average velocity is desirable to optimize power output. The maximum thrust, or force, on a turbine in fluid flow is given by:

$$\text{Thrust}_{Newtons}=(3/8) \times A \times \rho \times V^2 \quad (5)$$

Once the velocity profile has been determined for a certain tube configuration and wave profile, the expected power output can be calculated from Equation 4. Also, the necessary buoyancy volume to balance the thrust force and maintain stationary position for the tube can be calculated from Equation 5.

Mooring of the above-described embodiments is now described.

In the example shown in FIG. 2, a mooring attachment to the sea bottom is shown. The mooring attachment acts as a mechanical datum to resist the upward and downward forces of the piston and keeps the tube fixed in place. The mooring attachment must be strong enough to withstand the downward forces produced by the unit, and heavy enough to resist the upward forces produced by the unit. It must be strongly attached to the ocean bottom to resist the forces produced by storm waves.

Figure 5:
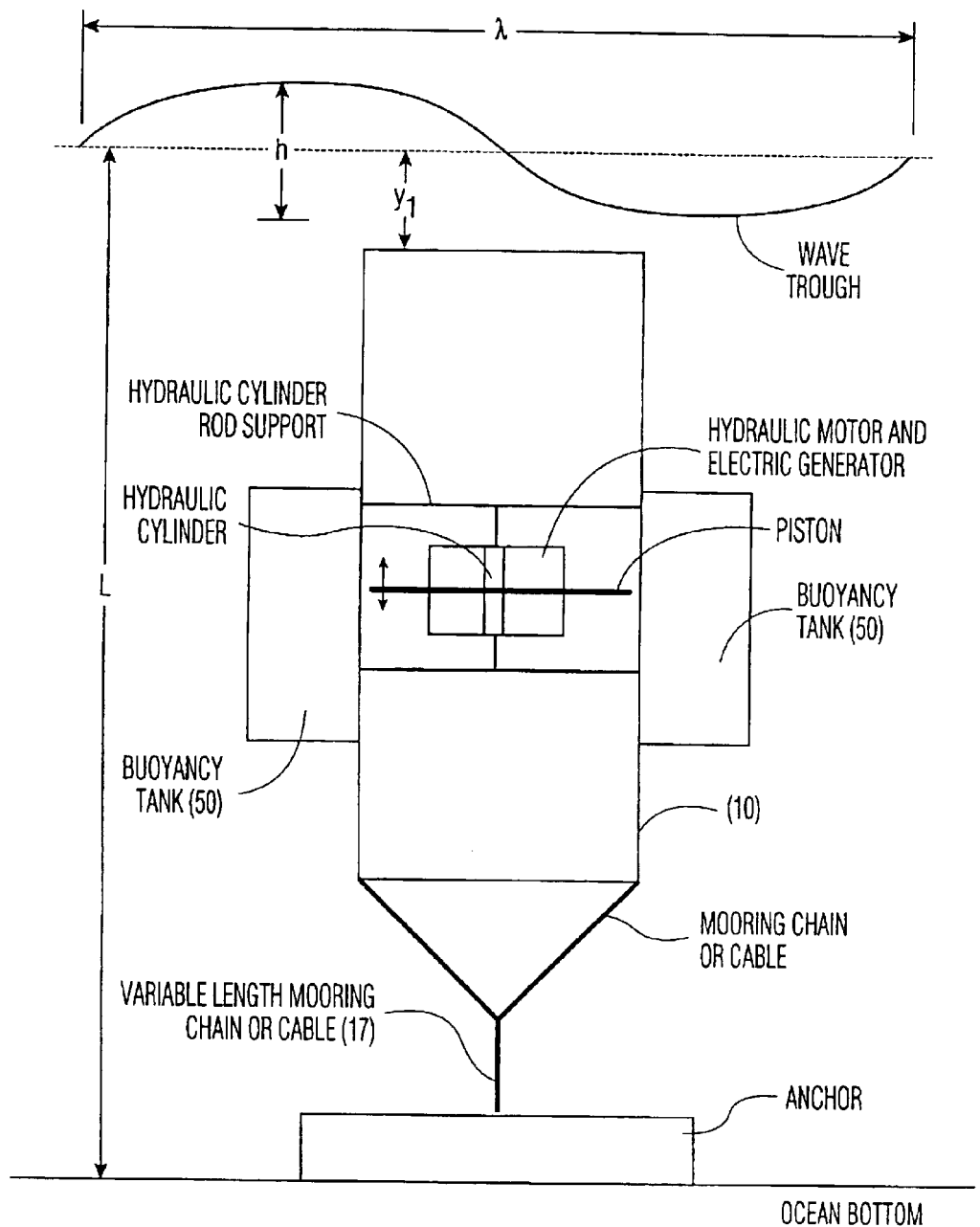

In other sites the water may be too deep for practical bottom mounting. FIG. 5 shows an arrangement for mooring the inventive systems in virtually any depth of water because the length of its mooring chain 17 is variable. The tube 10 is held in vertical position by buoyancy tanks 50 attached to its outer perimeter. These buoyancy tanks are sufficiently buoyant to float the unit to the surface were it not held by its mooring chain or cable. The tanks are buoyant enough to support the weight of the unit plus at least the maximum downward force exerted by the piston against the tube. This prevents the tube from moving lower during normal operation of the power producing tube. The mooring chain must be at least strong enough to resist the net upward force of the buoyancy tanks, plus the maximum upward force produced by the piston against the tube. The anchor also must weigh at least as much as the net upward force of the buoyancy tanks plus the maximum upward force produced by the piston against the tube to prevent lifting of the anchor.

The fixed depth mooring arrangements shown in FIGS. 2 and 5 will allow tidal changes in water depth to affect power capturing performance. In normal tides, for example 1 meter, the effect is small. A preferred mooring plan is to moor the unit at its planned depth below the surface at the midpoint of the tidal change. Then some times it will be deeper below the surface (high tide), and some times it will be closer to the surface (low tide) than planned. Table 1 indicates that the energy level at the top of a tube that is 1 meter below the mean surface of waves with a 7 second period is 4% less than if it were 0.5 meters below the mean surface. Thus a unit that was moored 1 meter below the surface at mid-tide in a 1 meter tidal environment would range from plus or minus 0.5 meters from the planned depth during a day. A unit moored so shallow that wave troughs expose the top of the unit suffers little or no loss in power output. Therefore, such a unit fixedly moored as discussed above will produce approximately at its average planned level in a normal tidal environment. In areas with high tides, the unit is preferably mounted lower in the water to prevent excessive exposure during wave troughs. This will reduce the average power that the unit can capture as can be estimated from Table 1. To meet a certain power goal, a slightly larger unit is required than if the site had smaller tidal changes. The simplicity of a fixed mooring arrangement generally outweighs the power loss in sites with range of depths and tides that are not extreme.

Figure 6:
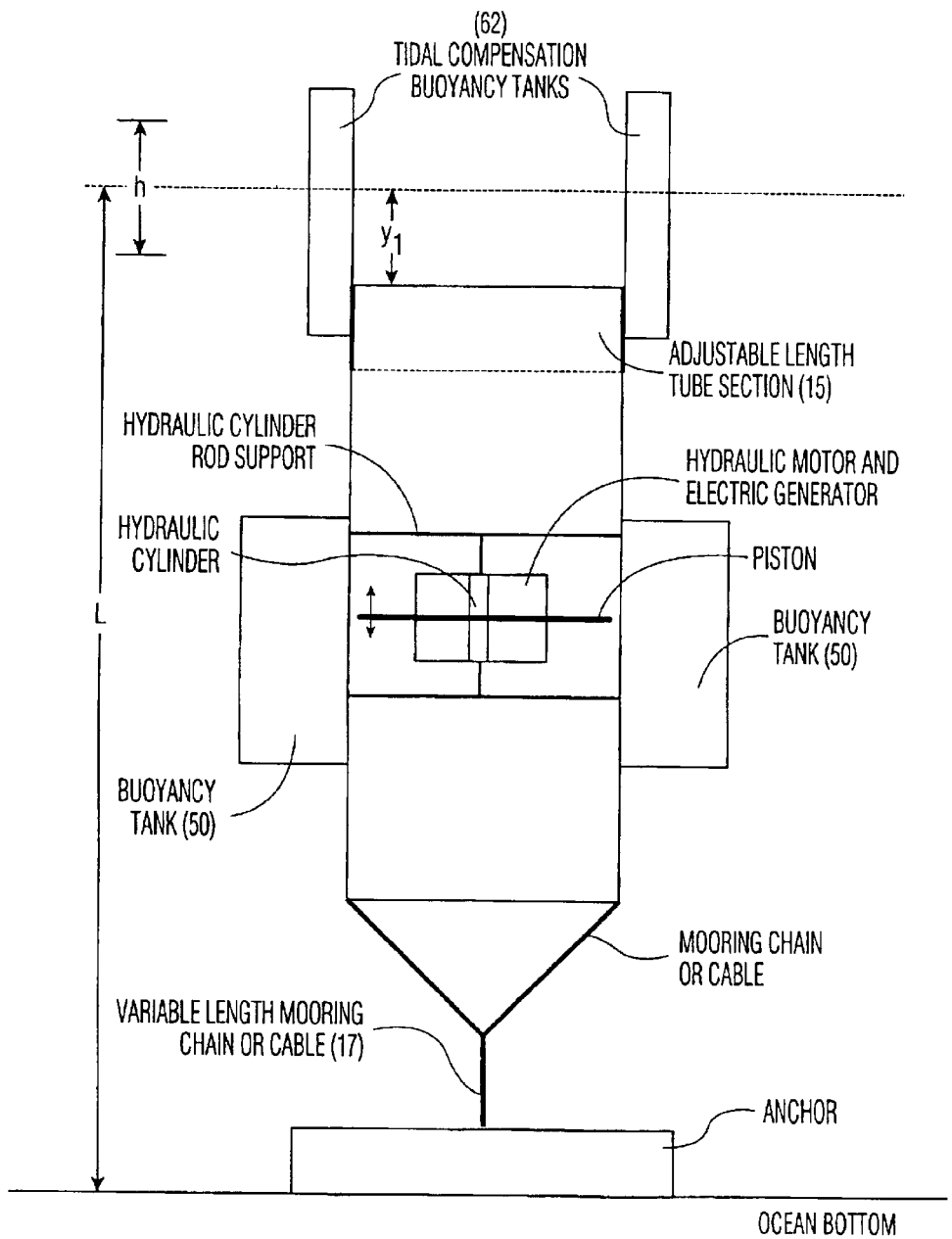

A second mooring approach, shown in FIG. 6, combines a fixed bottom mounting and a floating tube top. The fixed bottom mounting provides the simplicity discussed above, and the float provides tidal compensation. In this case, the top portion of the tube 15 is flexible and can be extended upward by the buoyancy of a small float 62 when the tide is high and raises the mean water level. When the tide is low, the float 62 follows the water level downward compressing and shortening the flexible top tube section 15. The float maintains the top of the tube at a relatively fixed depth below the water surface, e.g., 1 meter. The apparent change in the water height above the tube is approximately the same whether the water is rising and falling above a fixed open tube top, or is rising and falling above the tube extension. In this arrangement, the large forces produced by the piston working in its pressure driven mode are countered by the fixed mooring buoyancy tanks 50, while the added buoyancy tanks 62 only raise and lower the top of the tube.

Figure 7:
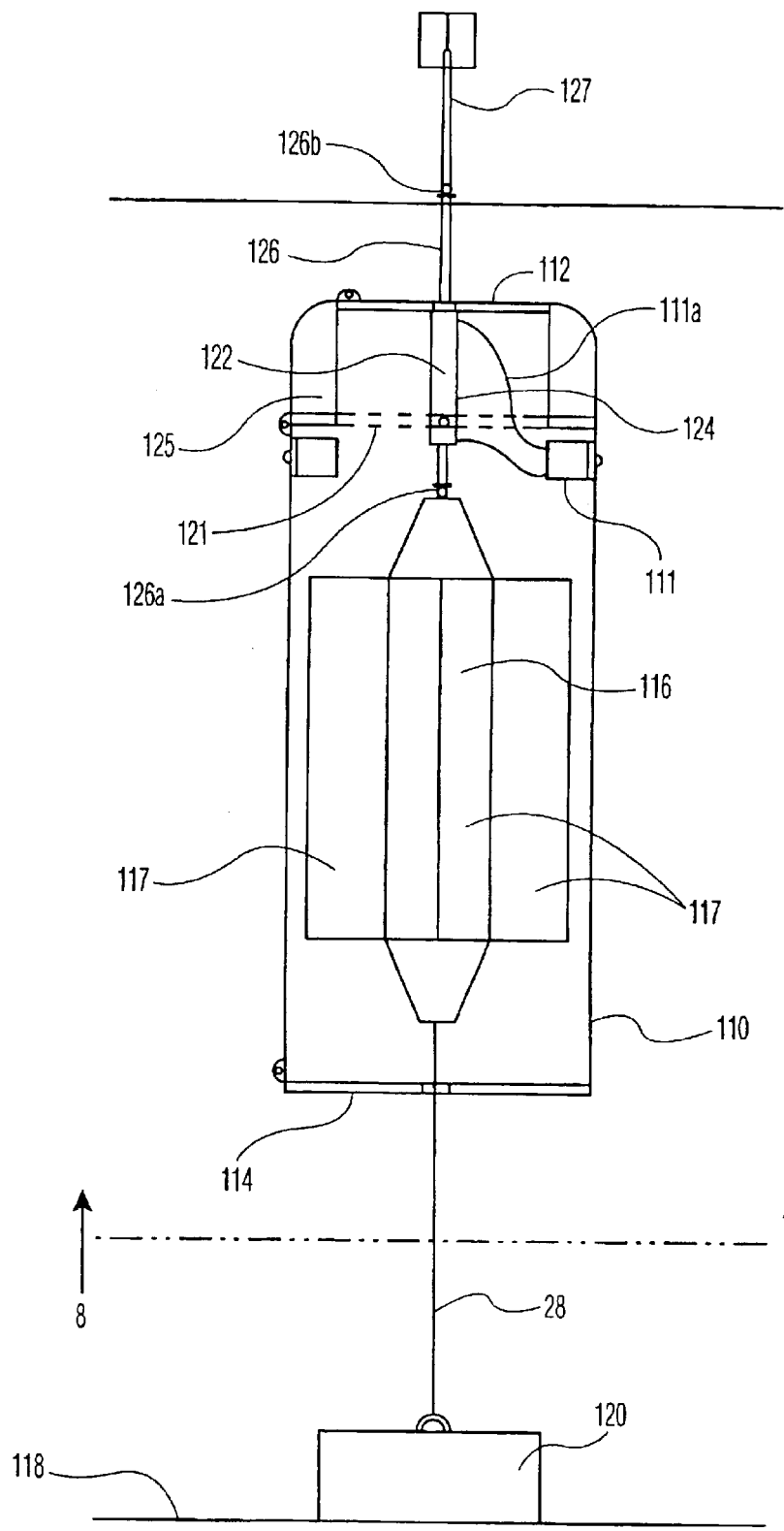
FIG. 7 is a side elevational view of an energy converter in accordance with a second embodiment of the invention.
Figure 8:
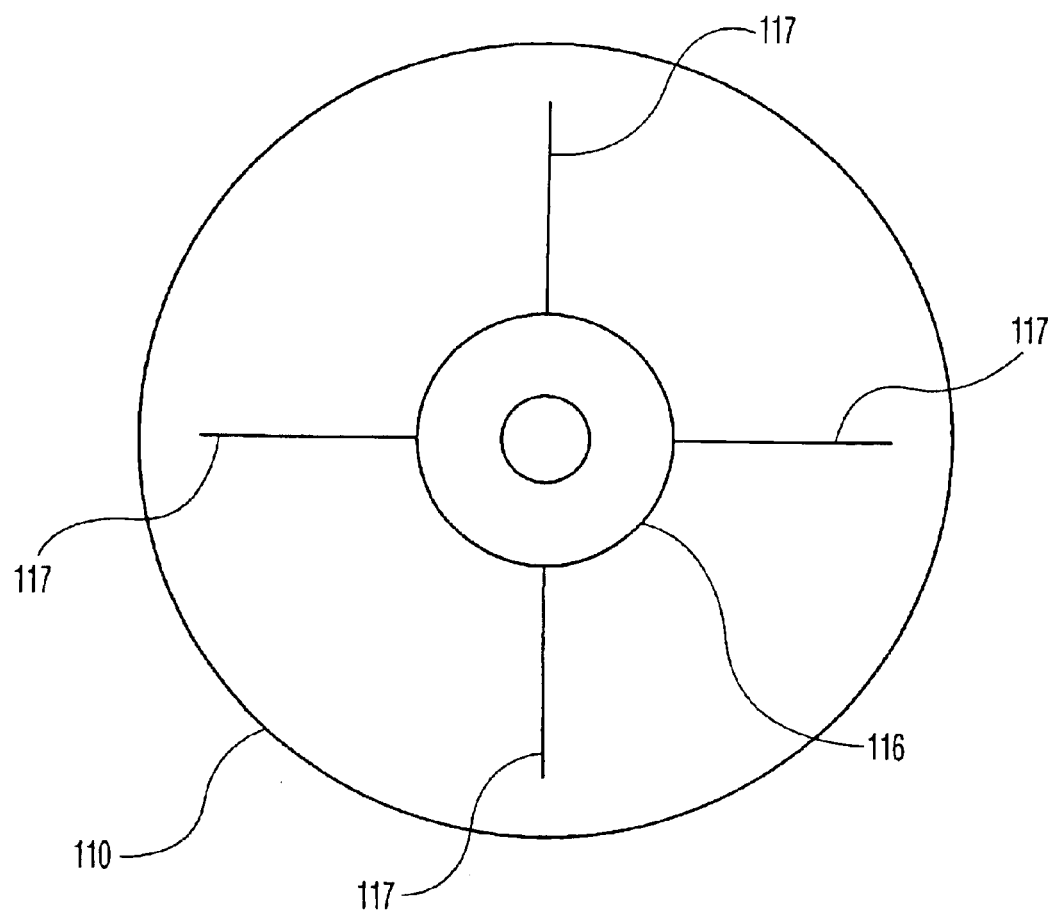
FIG. 8 is an end view of the converter looking in the direction of the arrows 8—8 in FIG. 8.
Figure 9:
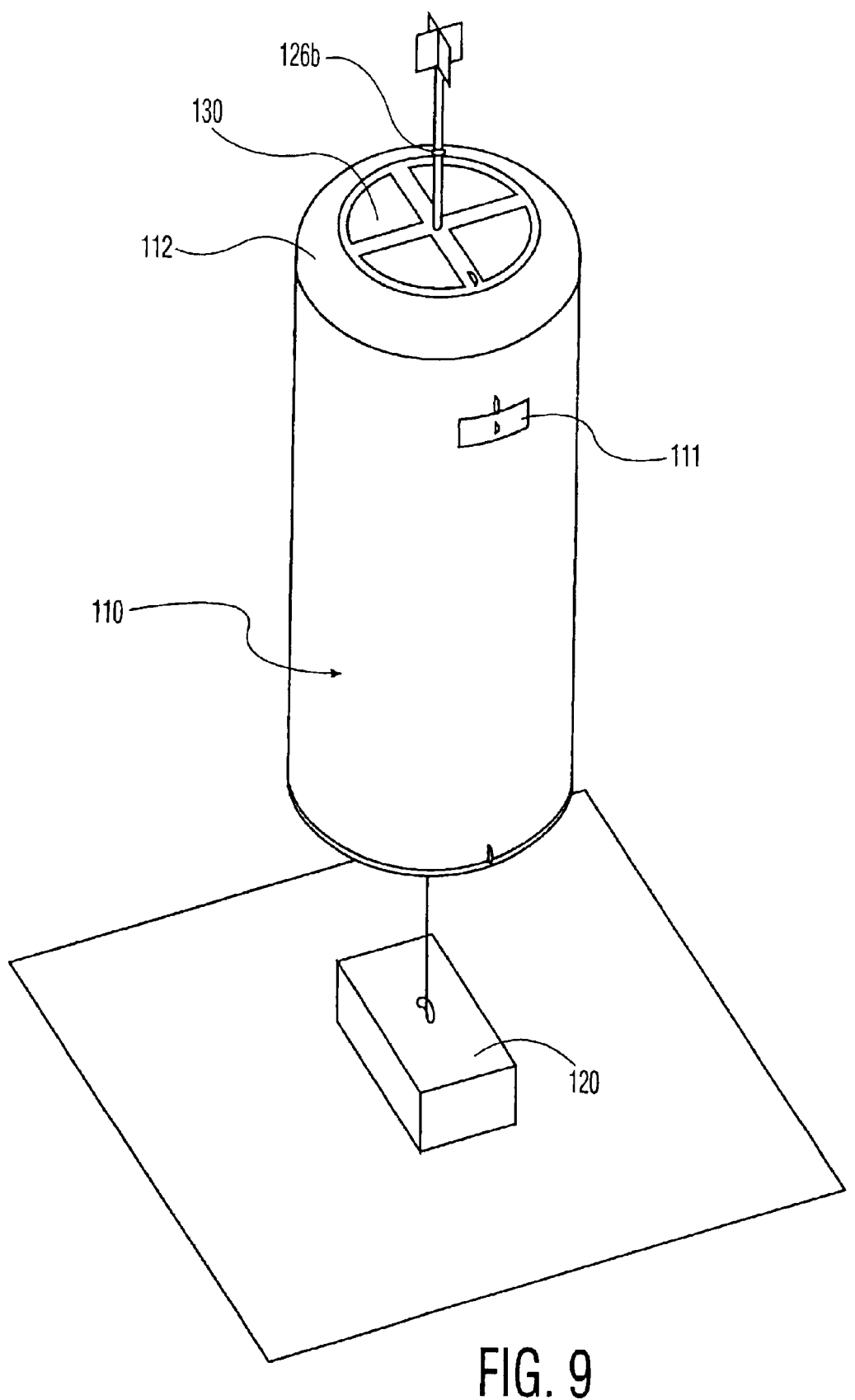
FIG. 9 is an isometric view of the converter shown in FIGS. 7 and 8.

A second embodiment of the invention, illustrated in FIGS. 7 through 9 is now described.

FIGS. 7–9 show a hollow tube 110 having a closed top end 112 and an open bottom end 114. As previously described in the first embodiment, the tube 110 is in vertical, submerged orientation but, unlike the tube 10 in the first embodiment, which is preferably fixed in place, the tube 110 of the second embodiment is vertically movable relative to a fixed support. Such support can be a rigid structure mounted on the water bed, but, especially in deep water, is preferably a float 116 fixedly moored to the water bed 118 by an anchor 120 and a chain or cable 128.

Most conveniently, the tube 110 encloses the float 116 and, because the tube is vertically elongated, the float 116 is similarly elongated.

The float 116 has a large buoyancy, and corresponds to a fixed structure rigidly mounted on the water bed but with the exception that some horizontal displacement of the float can occur in response to horizontal water movements. Such horizontal displacements of the float will generally occur at a slow rate and, essentially, the function of the float is to provide a definite position of the tube relative to the water bed. In situations where large changes in the water level occur, means, generally known, are used for adjusting the distance between the float and the water bed for maintaining a fixed distance between the float and the water surface. However, and as explained in the description of the first embodiment, power generation is relatively insensitive to moderate water level changes and, typically, the float is positioned for optimum performance at the average water level and not thereafter changed in position with water level changes.

The tube 110 is secured to the float 116 by means of a hydraulic pump 122 of known type comprising a rigid casing 124 with a piston rod 126 (for pumping fluids within the pump) extending entirely through and outwardly from both ends of the casing 124. Herein, the pump casing 124 is rigidly secured to the movable tube 110 by a spoke-like bracket 121 (so as not to impede water movement within the tube 110). The upper end of the pump casing 124 is rigidly secured to the closed top end of the tube 110 but with one end 126b of the piston rod 126 extending through the tube end. (Optionally, a navigation aide 127 is attached to the rod end 126b and extends above the surface of the water.) The other end 126a of the piston rod 126 is rigidly secured to the float 116. The tube is neutrally buoyant and includes a hollow buoyancy chamber 125. Being neutrally buoyant, the tube 110 vertically oscillates in response to tube top-to-bottom pressure variations caused, as previously described, by passing waves. Vertical oscillations of the tube 110 relative to the fixed float 116 thus cause relative movements between the pump casing 124 and the pump piston rod 126, the result being the generation of alternating hydraulic pressures within the pump which can be used for pressure circulating a fluid through hoses 111a for driving a hydraulic motor-electrical generator 111.

Factors influencing the design of the overall system are similar to those described in the description of the first embodiment. Therein, a piston within a stationary tube moves in response to passing waves. Herein, the closed (upper) end 112 of the tube 110 functions as a piston movable relative to a fixed support.

During operation, the tube upper end 112 remains submerged for all passing waves within a range of wave sizes with which the system is designed to operate. For avoiding excessive forces due to extra large waves, pressure relief valves are used, e.g., in the form of spring biased doors 130 shown in FIG. 10 at the top end 112 of the tube 110. Herein, four doors 130 are shown. If the pressure differential between the water above the tube and the water inside the tube exceeds a preselected level, two of the doors open downwardly to equalize the pressure within and outside the tube 110. The other two doors 130 open upwardly to relieve internal excess pressures due to excessively deep wave troughs passing over (or beneath) the tube upper end 112. The spring bias for the doors 130 can be obtained from weights or buoyant compartments on the doors.

An advantage of the cable anchored arrangement shown in the figures is that the unit is free to move horizontally due to wave action. This reduces the horizontal forces imposed on the mooring and reduces the mass of the required mooring. Large horizontal movements tend to lower the tube upper end 112 relative to the water surface. This lowering tends to reduce the output power from the unit otherwise obtainable when the tube upper end 112 is optimally spaced beneath the water surface (previously described). However, as previously noted, changes in power production with increased spacings of the tube end from the water surface are rather gradual, and useful power production continues even with large horizontal leanings of the unit.

Relative horizontal movements between the float 116 and the tube 110 are preferably avoided for avoiding damage of the mechanical coupling therebetween. For such movements to occur, in response to lateral movements of the tube 110, water must move within the tube 110 from side to side of the float 116. Such water movements, and attendant relative lateral movements of the float 116 relative to the tube 110, are essentially prevented by the use of vertically elongated, radially extending fins 117 shown in FIGS. 8 and 9.

The above-described arrangement of a float 116 within a tube 110 provides a self-contained unit which can be readily assembled on-shore and transported for simple placement at an ocean site. In such arrangement, the float 116 serves as a fixed support on which a transducer is fixedly mounted; the transducer, in turn, being connected to and driven by the movable tube 110.

Figure 10:
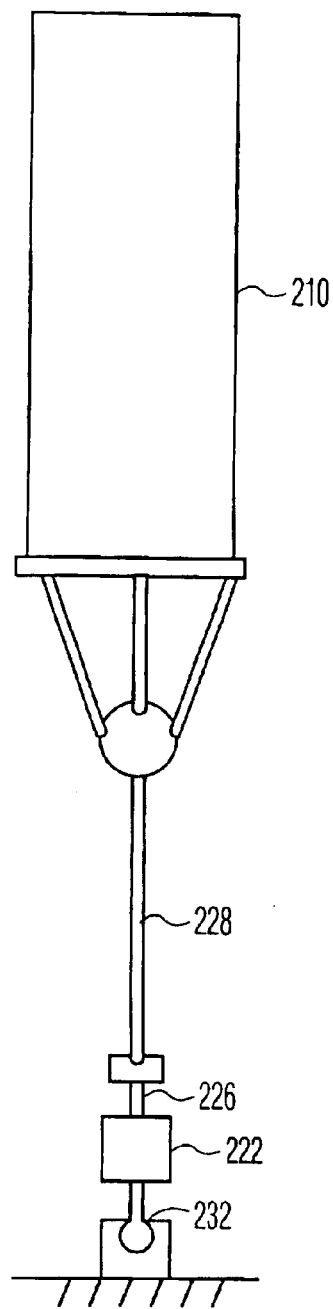
FIG. 10 is a side elevational view of a modified version of the embodiment shown in FIGS. 7–9.

In an alternate arrangement, shown in FIG. 10, a transducer 222 (e.g., a hydraulic tube or the like) is fixedly mounted on the floor of the ocean (preferably by a mechanical coupling, e.g., a ball-socket joint 232, allowing pivoting of the transducer 222), with the movable piston rod 226 of the transducer rigidly connected to the bottom end of a neutrally buoyant tube 210 identical to the tube 110 shown in FIGS. 7–9 but not including an internal float. The tube 210 is connected to the piston rod 226 (again, preferably by a pivoting coupling) by an anchoring link 228 which can be an anchor chain or, preferably, a solid rod having a high modulus of elasticity, i.e., low straining with applied stress.

In the very first patent (U.S. Pat. No. 4,404,490) issued to the owner of the present invention, reference is made to "cancellation effects", i.e., the energy robbing effect when the dimensions of the wave energy collector are a significant fraction of the wave length of the surface waves (the subject matter of such patent being incorporated herein by reference). Herein, for example, top to bottom pressure variations across the lengths of the various herein disclosed tubes occur in response to passing waves. If, for example, the diameter of the tubes were equal to the wave lengths of the passing waves, the pressure increases caused by the wave crests overlying the tube top ends would be cancelled by the simultaneous presence of the overpassing wave troughs. Thus, no vertical oscillations of the tubes would occur. Ocean waves, however, tend to be quite large and, for practical reasons, the diameter of the tubes are so small in comparison with the wave lengths that cancellation effects can be ignored—provided that the tube diameters are not in excess of a relatively small proportion of the wave length, e.g., 10%.

Any such cancellation effect occurs in directions parallel to the directions of movements of the waves. No cancellations occur in directions normal to the wave directions, hence quite large area tubes can be used of rectangular cross-section provided the axis of greater length (in excess of 10% of the wave length) is maintained perpendicular to the wave direction.

Within the embodiment shown in FIG. 10, the transducer 222 disposed below and outside the tube 210, a hollow space within the tube 210 for containing the transducer 222 and a float 116 (as in FIG. 7) is not required, and the tube 210 need not be hollow and need not have an open bottom end. The only requirements for the tube 220, in accordance with the present invention, are that it is similar to the tube 110 in that it has the same outside dimensions (for use with the same wave environment) and has a closed top end serving as a piston responding to surface wave pressure variations. The tube 220, similarly as the tube 110, must be neutrally buoyant, for vertical oscillations in response to top to bottom pressure variations caused by overpassing waves, but the tube can be hollow or solid to any extent as may be desired.

In all the inventive embodiments disclosed herein, the energy capturing member, e.g., the movable cylinder 110 shown in FIG. 7, receives energy from the passing surface waves by virtue of water pressure variations. Specifically, a float bobbing up and down on the water surface, such as commonly disclosed in the prior art, is not used. This difference from the prior art can be expressed by such statements that the energy capturing elements, e.g., the movable cylinder 110, are structurally separated from the surface of the water (i.e., not connected to a surface float) and/or that such energy capturing elements are mounted on a support disposed in essentially fixed position relative to the mean water level. Such support can be anchored to the floor of the body of water or, alternatively, can comprise a float of such size as to be relatively vertically stationary in response to passing waves.

Further, while FIG. 7 shows a mast 126 projecting upwardly above the water surface, the mast is not mounted on the movable cylinder 110, hence does not structurally interconnect the cylinder 110 to the water surface. However, even if the mast 126 were mounted directly on the cylinder 110 for movements therewith, the mast 126 does not, as herein defined, structurally interconnect the cylinder to the water surface because the mast captures no energy, as does a float, from passing surface waves.

As described, energy capture is by virtue of water pressure variations. In co-pending application Ser. No. 10/080,181, filed Feb. 20, 2002 (the subject matter of which is incorporated herein by reference), there is disclosed an arrangement for capturing energy present in tilting movements of the vertically extending apparatus caused by movements of the surrounding water. Such arrangement can be used with the present invention.

What is claimed is:

1. A method for capturing energy from preselected surface waves on a body of water, the waves varying from a maximum to a minimum wavelength and having a maximum amplitude above and below a mean water level present during the passage of said waves, the method comprising disposing in said body of water an elongated cylinder in vertical and completely submerged orientation relative to said mean water level, the cylinder having a top end structurally separated from the surface of the water and disposed at a first depth approximately equal to said maximum amplitude, and the cylinder having a bottom end disposed at a second depth where the energy level associated with waves at said maximum wavelength is a small percentage of the energy associated with said maximum wavelength waves at said mean water level, and preventing water flow through the cylinder in response to cylinder top to bottom water pressure differentials caused by said passing waves for causing energy capturing movements of said cylinder.

2. A method according to claim 1 wherein the said second depth is equal to about 50% of said maximum wavelength waves.

3. A method according to claim 1 including mounting said cylinder for limited vertical movements on a support in essentially fixed position relative to said mean water level.

4. A method according to claim 3 wherein said stationary support is a float, and including the steps of anchoring said float beneath the surface of the body of water and mounting said cylinder in enclosing relationship with said support.

5. A method of capturing energy from surface waves on a body of water comprising:

submerging an elongated member within said water body in vertical orientation with a closed end of said member up;

mechanically supporting said member in vertical movable relation with, and solely by, a support disposed in essentially fixed position relative to the mean water level of said body of water such that a principal mechanism for transferring energy from said surface waves to said member comprises variable water pressure differentials between opposite ends of said member.

6. A method according to claim 5 including disposing said member within said body of water in relation to the mean water level of said body such that variations in water pressure, caused by overpassing waves, at the top of said member are at least 50% larger than the water pressure variations caused by said waves at the bottom of said member.

7. A method according to claim 5 including the step of anchoring said support to the floor of said body of water.

8. A method according to claim 7 wherein said support is a float, and said elongated member is hollow, and including the step of mounting said elongated member in enclosing relation with said float.

* * * * *